(12) United States Patent
Imaoka et al.

(10) Patent No.: US 6,597,517 B2
(45) Date of Patent: *Jul. 22, 2003

(54) LENS BARREL

(75) Inventors: Yasunori Imaoka, Utsunomiya (JP); Takeshi Idemura, Utsunomiya (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 41 days.

(21) Appl. No.: 09/573,962

(22) Filed: May 19, 2000

(65) Prior Publication Data
US 2002/0057503 A1 May 16, 2002

(30) Foreign Application Priority Data
May 25, 1999 (JP) .............................. 11-145684

(51) Int. Cl.[7] .............................................. G02B 15/14
(52) U.S. Cl. ....................................... 359/697; 359/696
(58) Field of Search ................................ 359/694, 696, 359/697, 698, 703, 704

(56) References Cited

U.S. PATENT DOCUMENTS

| 4,449,807 A | * | 5/1984 | Miki et al. | 396/144 |
| 4,461,544 A | * | 7/1984 | Isobe et al. | 359/698 |
| 4,596,449 A | * | 6/1986 | Iwata et al. | 359/696 |
| 5,153,636 A | * | 10/1992 | Maetani | 355/45 |
| 5,715,101 A | * | 2/1998 | Nakamura et al. | 359/823 |
| 5,731,919 A |   | 3/1998 | Yamamoto | 359/824 |

FOREIGN PATENT DOCUMENTS

| JP | 7-306355 | 11/1995 |
| JP | 9-138335 | 5/1997 |

* cited by examiner

Primary Examiner—Ricky Mack
(74) Attorney, Agent, or Firm—Fitzpatrick, Cella, Harper & Scinto

(57) ABSTRACT

A lens barrel includes an optical lens unit, a manual operation member for manually moving the optical lens unit in an optical axis direction, a motor member for driving the optical lens unit in the optical axis direction, a motor operation member for actuating the motor member, the motor operation member being arranged to output a signal relating to an operation of the motor operation member, and the motor member being arranged to be driven according to the signal, a transmission mechanism capable of driving the optical lens unit in the optical axis direction by concurrently transmitting an operation force of the manual operation member and a driving force of the motor member to the optical lens unit, and a setting member for setting the motor member into an inoperative state.

59 Claims, 8 Drawing Sheets

LENS BARREL

BACKGROUND OF THE INVENTION

1. Field of the Invention

The present invention relates to a television lens of a photo-taking apparatus such as a television camera, and more particularly to a lens barrel arranged to prevent erroneous operations.

2. Description of the Related Art

A device for driving optical means by transmitting a driving force from driving means to manual operation means through magnetic coupling means has been disclosed in Japanese Laid-Open Patent Application No. Hei 9-138335 (corresponding to U.S. Pat. No. 5,731,919).

FIG. 12 shows the device disclosed in the above-cited patent application, the details of which are omitted from the description herein. In brief, the device is arranged to transmit the rotation of a rotor 81 of a driving motor to a manual operation ring 84 through a slipping surface of a thin plate 82 which is coupled with a magnet 83 by a magnetic force generated between them. In carrying out a motor driving operation, the manual ring 84 is rotated by the motor to move optical moving means held inside the device.

In the case of manual operation, a large holding force of the motor permits the manual ring 84 to slip at the magnetic coupling part so as to move only the manual ring 84 and the optical means internally coupled with the manual ring 84.

An advantage of the device described above, as an example of the prior art, lies in that the device enables the user of the photo-taking apparatus to freely select either a motor driving operation or a manual operation without performing any additional operation for switching between the motor driving operation and the manual operation.

However, it has been a problem with the prior art example that, if a unit or an operation part provided for the motor driving operation is inadvertently touched by the user during manual operation, movement of the optical means under the manual operation would be affected by the inadvertent touch, because it instantly renders the motor driving operation possible.

This drawback occurs particularly in cases where the above-stated arrangement is applied to television (TV) zoom lenses for zoom driving, including, of course, such a television zoom lens that uses a dedicated operation accessory. FIGS. 13 and 14 illustrate such an arrangement including a TV camera, a TV lens, and a zoom operation switch 88 for a motor driving operation disposed at a position where it is readily operable, i.e., readily touchable, on a lens grip 87, which is generally provided for holding the camera 85 and the lens 86. Therefore, although the above-cited prior art arrangement, which obviates the necessity for any additional operation for switch-over, excels in operability, use of it for driving the lens of such a TV camera tends to cause a motor driving operation to be inadvertently performed while a manual operation is in process.

BRIEF SUMMARY OF THE INVENTION

It is an object of the present invention to overcome the above-mentioned problems and to provide a lens barrel or a photo-taking apparatus which has a setting switch arranged to prevent any erroneous operation from being unintentionally performed by the user thereof, and which excels in safety and the like.

To attain the above object, in accordance with an aspect of the present invention, there is provided a lens barrel, which comprises an optical lens unit, a manual operation member for manually moving the optical lens unit in an optical axis direction, a motor member for driving the optical lens unit in the optical axis direction, a motor operation member for actuating the motor member, the motor operation member being arranged to output a signal relating to an operation of the motor operation member, and the motor member being arranged to be driven according to the signal, a transmission mechanism capable of driving the optical lens unit in the optical axis direction by concurrently transmitting an operation force of the manual operation member and a driving force of the motor member to the optical lens unit, and a setting member for setting the motor member into an inoperative state.

In particular, in the lens barrel, the setting member is arranged to cut off a supply of electric power to the motor member.

Further, in the lens barrel, the setting member is arranged to bring the signal relating to the operation into an off-state.

Further, in the lens barrel, the motor operation member is arranged to output a signal corresponding to an amount of operation of the motor operation member.

Further, in the lens barrel, the motor operation member is a seesaw-type switch.

Further, in the lens barrel, the motor member is arranged to drive the manual operation member.

In accordance with another aspect of the invention, there is provided a lens barrel, which comprises an optical lens unit, a manual operation member for manually moving the optical lens unit in an optical axis direction, a motor member for driving the optical lens unit in the optical axis direction, a motor operation member for actuating the motor member, the motor operation member being arranged to output a signal relating to an operation of the motor operation member, and the motor member being arranged to be driven according to the signal, a transmission mechanism for transmitting a driving force of the motor member to the optical lens unit, determination means for determining, on the basis of the signal relating to the operation, whether the motor operation member is being operated or not, cut-off means for cutting off transmission of the driving force of the motor member by the transmission mechanism if the determination means determines that the motor operation member is not being operated, and a setting member for setting the motor member into an inoperative state.

In particular, in the lens barrel, the cut-off means is a clutch mechanism.

Further, in the lens barrel, the motor operation member is provided on a lens grip disposed at the lens barrel.

Further, the lens barrel is a television lens barrel.

The above and other objects and features of the present invention will become apparent from the following detailed description of preferred embodiments thereof taken in connection with the accompanying drawings.

DETAILED DESCRIPTION OF THE PREFERRED EMBODIMENTS

Hereinafter, preferred embodiments of the present invention will be described in detail with reference to the drawings.

Figure 1:
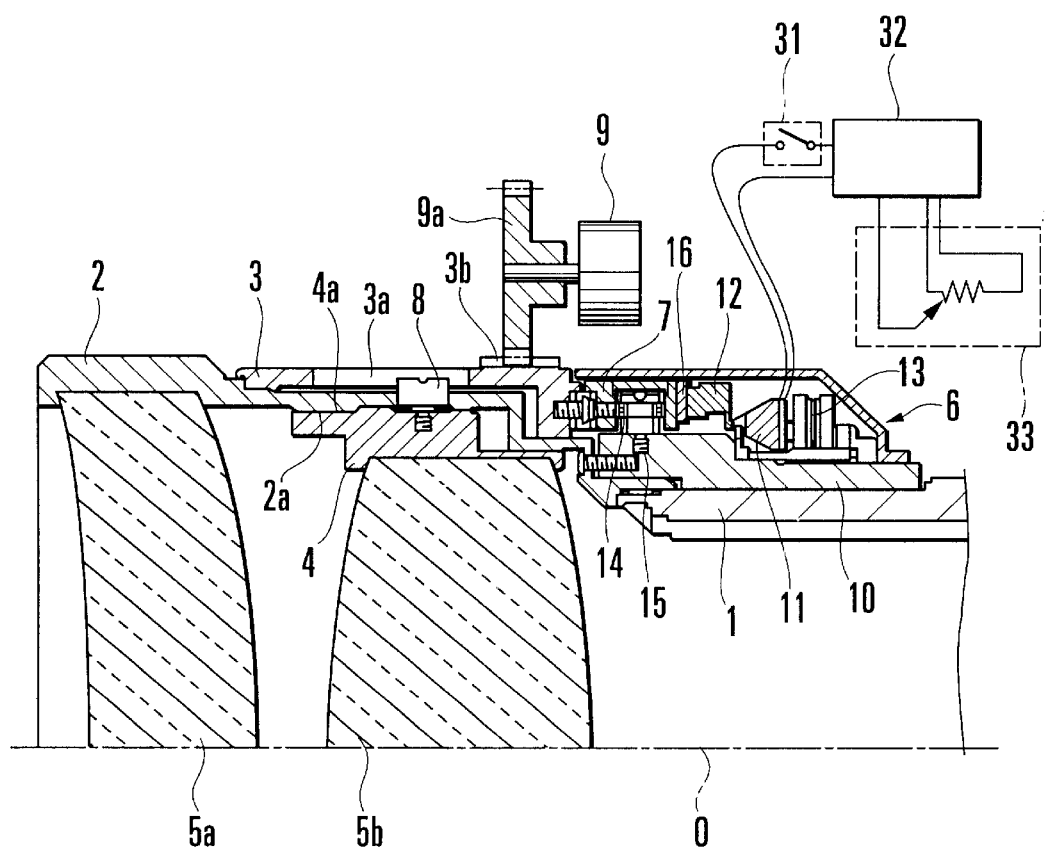
FIG. 1 is a sectional view showing, in part, a lens barrel according to a first embodiment of the present invention.
Figure 2:
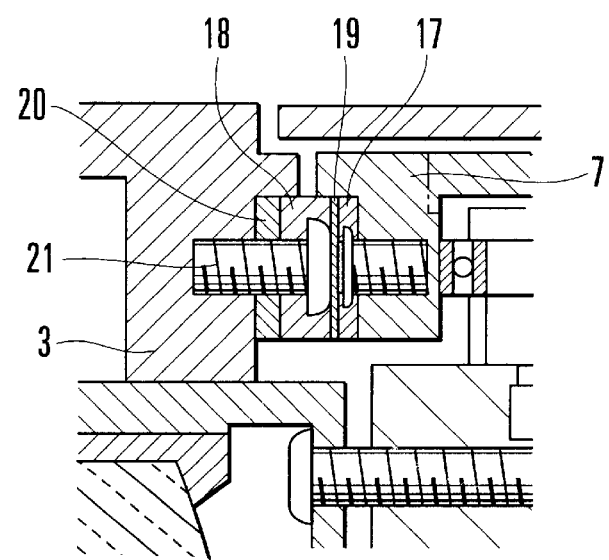
FIG. 2 is an enlarged sectional view showing a part of the lens barrel shown in FIG. 1.

FIG. 1 is a sectional view showing, in part, a focusing operation part of a lens barrel according to a first embodiment of the present invention. FIG. 2 is an enlarged view of a part of the lens barrel shown in FIG. 1. Referring to FIGS. 1 and 2, a lens base 1 is a fixed tube. A fixed base tube 2 is provided with a cam groove for moving a focusing lens. A focusing operation ring 3, serving as manual operation means, is arranged to be rotatable along the outer circumferential surface of the base tube 2. A helicoid thread 2a is provided for helicoid coupling on the inner circumferential side of the base tube 2. The base tube 2 is mounted on the lens base 1 with screws. A focus tube 4, which is disposed inside of the base tube 2, holds a focusing lens 5b. The focus tube 4 has a helicoid thread 4a formed on the outer circumferential side thereof. The helicoid thread 4a engages the helicoid thread 2a of the base tube 2.

The focusing operation ring 3 fittingly engages the base tube 2 and the output tube 7 of a drive unit 6 in a rotatable manner. In the case of a manual operation, the focusing operation ring 3 is manually operated by the user. The rotating force of the focusing operation ring 3 is transmitted to the focus tube 4 through a connection pin 8. The connection pin 8 is mounted on the fourth tube 4 and is fitted into a rectilinear motion groove 3a formed in the focusing operation ring 3. The focus tube 4 is arranged to be smoothly movable by the helicoid threads 2a and 4a in the optical axis direction in accordance with rotation of the focusing operation ring 3 caused by either manual operation or motor driving. A position sensor 9 which is composed of an encoder or a potentiometer is connected to the gear part 3b of the focusing operation ring 3 through a gear 9a.

A driving unit base 10 is one component element of driving means and is provided with a stator 11 and a rotor 12 to generate a rotating force of a known ultrasonic motor, i.e., a vibration wave motor. A belleville spring 13 is arranged to push the stator 11 toward the rotor 12 in such a way as to bring about a suitable frictional force between the stator 11 and the rotor 12. To prevent a driving force transmission system from being affected by the pushing force of the belleville spring 13, at least three bearings 14 are mounted on the driving unit base 10 through bearing shafts 15. Further, a shock absorbing rubber 16 is arranged to prevent the vibration of the rotor 12 from being transmitted to the driving force transmission system.

A ring-shaped magnetic thin plate 17, which is made of a thin sheet of permanent magnet of a semi-rigid Fe—Cr—Co system measuring about 0.5 mm in thickness is mounted on the output tube 7 of the drive unit 6, as shown in FIG. 2. A ring-shaped plastic magnet 18, which is made of a thin sheet composed of a ferrite system and a nylon base and measuring about 1.5 mm in thickness, is arranged to be opposed to the magnetic thin plate 17. The magnetic thin plate 17 and the plastic magnet 18 are arranged to exert attracting forces on each other. A spacer 19 is interposed in a space between the magnetic thin plate 17 and the plastic magnet 18. The spacer 19 which is made of a thin sheet of nylon base measuring about 0.1 mm in thickness, is attached to the plastic magnet 18 with an adhesive. An interval between the magnetic thin plate 17 and the plastic magnet 18 is kept constant by the spacer 19 while a friction torque is generated by sliding the spacer 19 in such a way as to regulate a hysteresis torque. A yoke plant 20 is disposed on the back side of the plastic magnet 18. The work plate 20 is made of a thin sheet of SECC-C20 (galvanized steel sheet, zinc coated) measuring about 0.5 mm in thickness and is arranged to form a magnetic circuit. The yoke plate 20 and the plastic magnet 18 are mounted together on the focusing operation ring 3 with screws 21.

In the first embodiment, the magnetic thin plates 17, the plastic magnet 18, the spacer 19 and the yoke plate 20 jointly form one element of magnetic coupling means for transmitting the driving force of the driving means, which includes the stator 11 and the rotor 12. The magnetic thin plate 17 and the plastic magnet 18 constitute a magnetic force generating means for generating a magnetic force. The magnetic coupling means is arranged to bring about a slip between the magnetic thin plate 17 and the spacer 19 for a load torque larger than a predetermined load torque.

The magnetic thin plate 17, the plastic magnet 18, the spacer 19, the yoke plate 20, etc., which constitute the magnetic coupling means, are respectively formed in ring shapes which extend in the circumferential direction of a casing. These parts are arranged along the circumference of the lens base 1 with an optical axis at its center. The whole lens barrel is compactly arranged by effectively utilizing spaces which are available there. The system components of the magnetic coupling means are directly connected to each other to prevent any movement or delay due to backlash or the like.

The stator 11 is connected a switch 31, which is arranged to permit cutting off of the supply of electric power to the driving means. A command circuit 33 is arranged to give commands to a control circuit 32 for control over the driving means. A photo-taking system may be formed by arranging the switch 31, etc., either on the photo-taking lens body or within a discrete unit such as an operation accessory. Further, the command circuit 33 is composed of a seesaw switch or the like, which is arranged to generate a signal corresponding to the amount of operation of the seesaw switch or the like. The motor is driven on the basis of the signal generated.

In the first embodiment, arranged in the above-stated manner, when the switch 31 is in its on-state, the lens can be driven by a manual operation or by a motor driving operation without any special change-over operation, as is apparent from the above-mentioned Japanese Laid-Open Patent Application No. Hei 9-138335 (U.S. Pat. No. 5,731,919). When the circuit is turned off using switch 31, electric power is no longer supplied to the driving means. Under that condition, the driving means stays stationary and inoperative even if the command circuit 33 happens to be operated by mistake, so that only manual operation can be performed.

Figure 3:
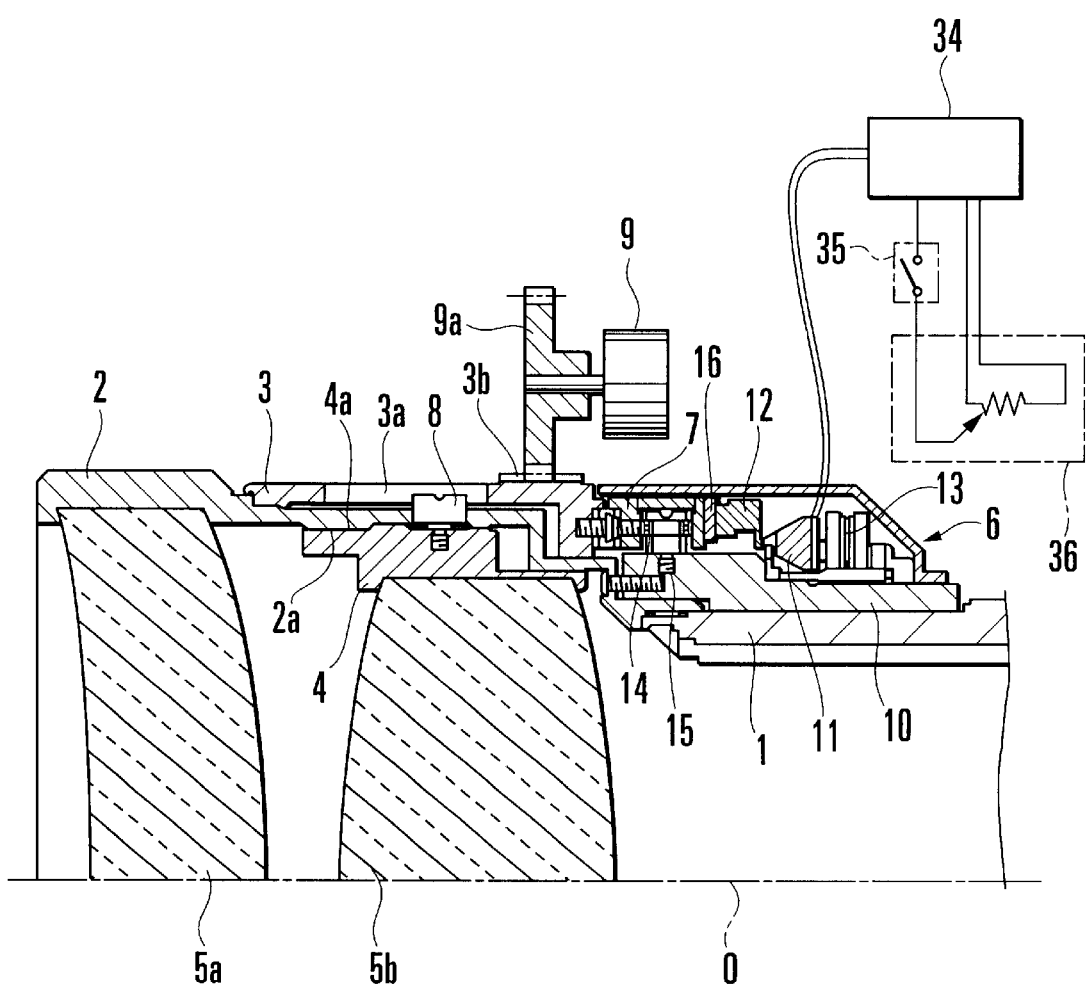
FIG. 3 is a sectional view showing, in part, a lens barrel according to a second embodiment of the present invention.

FIG. 3 is a sectional view showing, in part, a lens barrel according to a second embodiment of the present invention. All members that are the same as those of the first embodiment are indicated by the same reference numerals. The second embodiment differs from the first embodiment in that, instead of turning off the circuit leading to the driving means, input of a control signal is arranged to be cut off. More specifically, the second embodiment is provided with a control circuit 34, which is connected to the stator 11 and is arranged to control the driving means, a switch 35, which is arranged to be capable of cutting off a command signal, and a command circuit 36, which is arranged to give a command signal to the driving means. As in the case of the first embodiment, a photo-taking system may be formed by arranging these parts either on the side of the photo-taking lens body or in a discrete unit such as an operation accessory.

When the switch 35 is in its on-state, as in the case of the first embodiment, a motor (driving means) is driven according to a signal corresponding to the amount of operation of a seesaw switch or the like, and the lens can be operated or driven without performing any changeover operation between a manual operation and a motor driving operation. In this case, when the switch 35 is turned off, the control circuit 34 works in such a way as to keep the driving means at its current position. Under this condition, only manual operation is possible, because the control signal (the signal corresponding to the amount of operation) is not transmitted to the driving means and the driving means thus stays inoperative even if the command circuit 36 happens to be operated by mistake.

While each of the first and second embodiments is arranged to transmit the driving force by means of magnetism, the driving force may be transmitted by using some other means, for example, frictional means. While description has been given with respect to focus driving, the arrangement of each of the first and second embodiments is of course applicable also to a zooming operation or some other operation. Further, each of the first and second embodiments is arranged to use an ultrasonic motor as the driving means. The arrangement, however, may be changed to use some other motor, so long as the motor does not reversely rotate, or require a sufficiently large torque for reverse rotation.

The switch 31 or 35 may be replaced with a touch sensor. The modification can be arranged to do the same action as the first or second embodiment by arranging the touch sensor on a manual operation part and detecting the output of the touch sensor to perform a switching operation on the control circuit.

Figure 4:
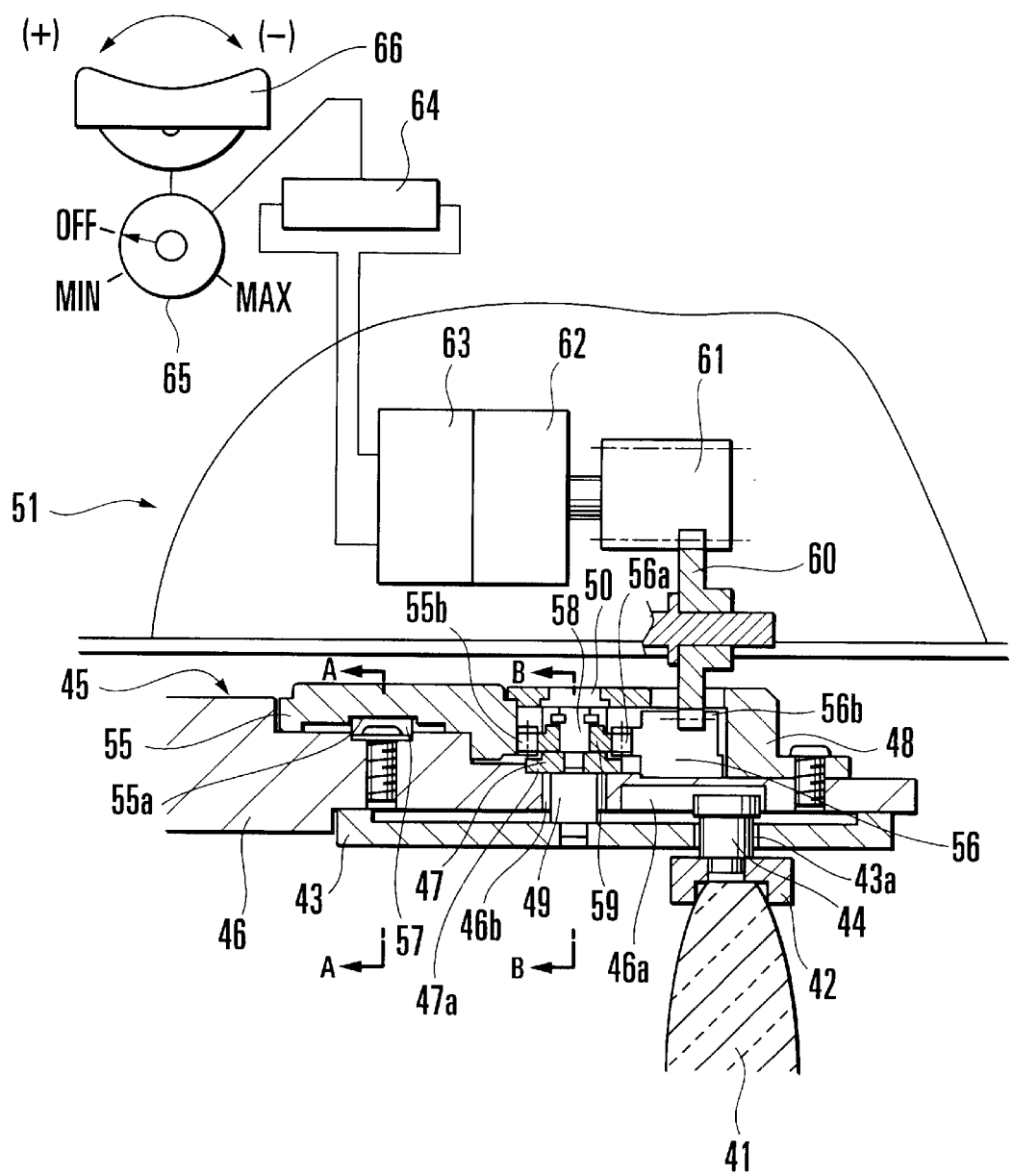
FIG. 4 is a sectional view showing, in part, a lens barrel according to a third embodiment of the present invention.
Figure 5:
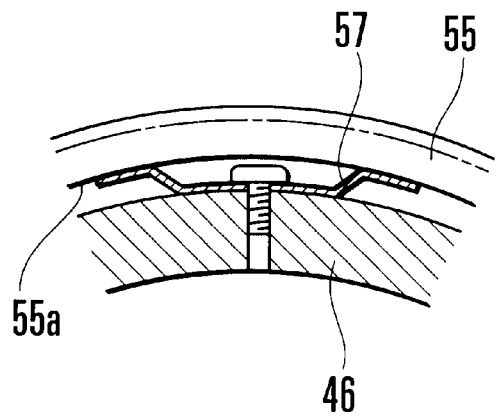
FIG. 5 is a sectional view taken along a line A—A in FIG. 4.
Figure 6:
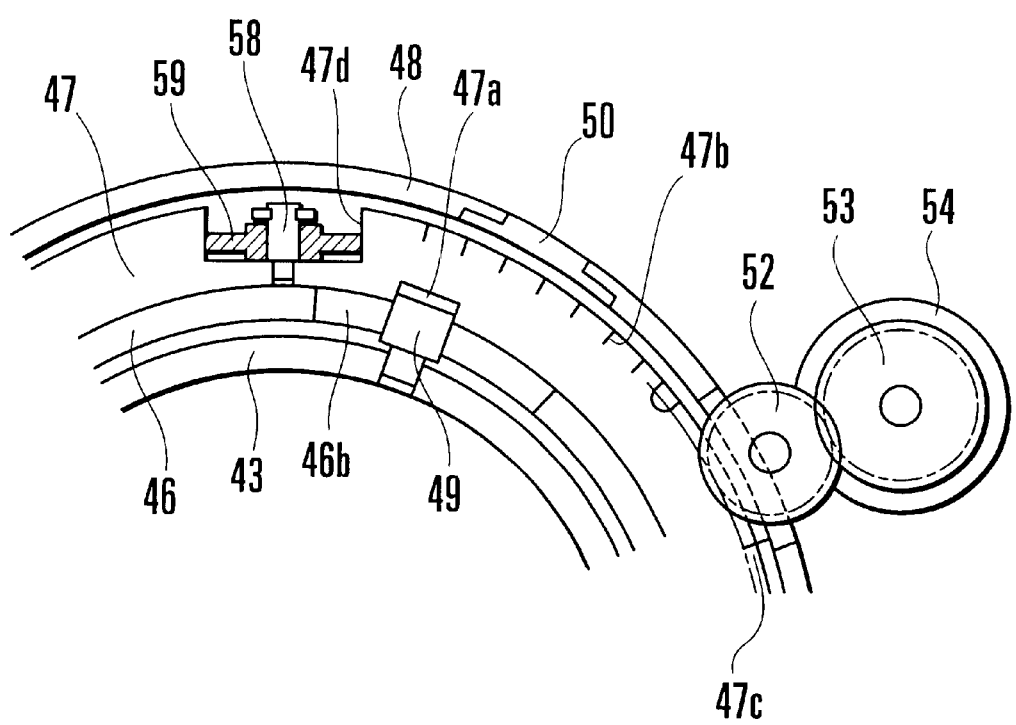
FIG. 6 is a sectional view taken along a line B—B in FIG. 4.

FIG. 4 is a sectional view showing, in part, a lens barrel according to a third embodiment of the present invention. FIG. 5 is a sectional view taken along a line A—A in FIG. 4. FIG. 6 is a sectional view taken along a line B—B in FIG. 4. In the third embodiment, the magnetic coupling means is replaced with gear coupling means, and the ultrasonic motor is replaced with a DC motor. A moving lens group 41 is held by a lens frame 42. The lens frame 42 is arranged to be movable in the optical axis direction inside a rotary tube 43. At least three roller members 44 are arranged to protrude from the outer circumferential surface of the lens frame 42. These roller members 44 engage, through curved slots 43a of the rotary tube 43, rectilinear motion grooves 46a of a fixed tube 46, which forms the lens casing 45.

A scale ring 47 is arranged along the outer circumference of the fixed tube 46. An outer tube 48 is disposed on the outer side of the scale ring 47. A connection pin 49 protrudes from the outer side of the rotary tube 43 to engage a groove part 47a of the scale ring 47 through a slot part 46b of the fixed tube 46, as shown in FIG. 6. By this arrangement, rotation of the scale ring 47 is transmitted to the rotary tube 43 through the connection pin 49 so as to move the moving lens group 41. A scale 47b is carved in a part of the scale ring 47 to indicate lens positions and is arranged to be visible through a transparent window 50 of the outer tube 48. A gear part 47c is arranged at a part of the scale ring 47 and is connected to a potentiometer 54 through a detecting idler gear 52 and a detecting gear 53 which are disposed within a drive unit 51. The lens position is detectable by this arrangement.

An operation ring 55 is arranged as manual lens displacing means on the outer circumferential surface of the fixed tube 46 on one end-side of the scale ring 47. On the other end-side of the scale ring 47 is arranged a driving gear 56 between the outer surface of the fixed tube 46 and the inner surface of the outer tube 48. The inner circumferential surface 55a of the operation ring 55 is pushed by leaf springs 57 at three parts of the whole circumference thereof so as to impose a predetermined load on the operation ring 55. At least three recessed pars 47d are formed on the outer circumferential surface of the scale ring 47. A support shaft 58 is provided within each of the recessed parts 47d to support a composite gear 59, which is made of an elastic material. A gear part 55b formed on the side surface of the operation ring 55 and a gear part 56a on the side surface of the driving gear 56 are tightly in mesh with the composite gear 59 so as to prevent rattling. Further, a gear part 56b formed on the outer side of the driving gear 56 is connected to a DC motor 63 through an idler gear 60, a motor gear 61 and a gear head 62.

The driving gear 56, the idler gear 60, the motor gear 61, the gear head 62 and the DC motor 63 constitute motor-driving lens displacing means. The scale ring 47, the support shaft 58 and the composite gear 59 constitute lens displacing amount combining means for combining the amount of manual driving and the amount of motor driving.

In a motor driving, the driving force of the DC motor 62 is transmitted to the driving gear 56 through the gear head 62, the motor gear 61 and the idler gear 60. Rotation of the driving gear 56 causes the composite gear 59 to rotate together therewith. Then, the rotating force of the composite gear 59 is transmitted to the operation ring 55. However, because the operating ring 55 is under a predetermined load imposed by the leaf springs 57, the operation ring 55 does not rotate, while the scale ring 47 rotates. Therefore, rotation of the scale ring 47 is transmitted to the rotary tube 43 through the connection pin 49. The rotary tube 43 then rotates so as to cause the moving lens group 41 to move.

In performing a manual operation, when the operation ring 55 is manually operated so as to rotate, the rotation of the operation ring 55 causes the composite gear 59 to rotate. Rotation of the composite gear 59 is transmitted to the driving gear 56. At this time, if the load on the motor-driving lens displacing means between the driving gear 56 and the DC motor 63 is heavy, the scale ring 47 rotates while the composite gear 59 is also rotating.

When the load on the motor-driving lens displacing means is light, on the other hand, the scale ring 47 does not rotate with the rotation of the driving gear 56. Thus, with the driving gear 56 rotating, the driving force of the operation ring 55 is not transmitted to the moving lens group 41. Further, because the operation ring 55 itself has no stop mechanism, the driving gear 56 is driven after the connection pin 49 is brought to a stop part by manual operation on the operation ring 55. Therefore, if the driving gear 56 readily rotates, the user may not be able to move the moving lens group 41, or may be unable to determine the arrival of the moving lens group 41 at its stop. The operability of the lens barrel would be greatly limited by such a condition.

In view of this, rotation of the driving gear 56 must be restricted during manual operation. To restrict rotation of driving gear 56 at the time of manual operation, a command to make the speed of the DC motor 63 zero is applied, so that the DC motor 63 does not rotate through the idler gear 60. With rotation of the driving gear 56 restricted, the rotating force of the composite gear 59 causes the scale ring 47 to rotate, so that the moving lens group 41 can be driven. In other words, control is performed so as to restrict rotation of the DC motor 63 without canceling control over the DC motor 63 during a manual operation.

In a case where a manual operation is performed while a motor driving operation is in process, since the operation ring 55 and the driving gear 56 which are in mesh with the composite gear 59 rotate concurrently, the scale ring 47 rotates according to a combined amount of rotation of the operating ring 55 and rotation of the driving gear 56. Therefore, the moving lens group 41 is moved so the extent of a combined amount of rotation of the operation ring 55 and rotation of the DC motor 63.

A control circuit 64 is connected to the DC motor 63 to control the speed of the DC motor 63. A speed potentiometer 65 is connected to the control circuit 64. A motor driving operation member 66 is connected to the speed potentiometer 65. The speed potentiometer 65 is arranged to permit setting the speed of the DC motor 63 to a speed between a minimum speed (MIN) and a maximum speed (MAX). When the motor driving operation member 66 is operated, the rotating speed of the DC motor 63 is controlled to a speed set at the speed potentiometer 65. The speed potentiometer 65 has an OFF position at which a switching function is performed to ignore and nullify a motor driving command signal coming from the motor driving operation member 66.

In the third embodiment, as described above, the motor driving command signal can be annulled by turning the speed potentiometer 65 to the OFF position. Therefore, even in the event of an erroneous operation of the motor driving operation member 66, the moving lens group 41 is never caused to move under such a condition, enhancing the safety of the lens barrel. Further, because the OFF position is arranged at the speed potentiometer 65, the number of necessary parts can be reduced.

The arrangement of the third embodiment for making the motor driving operation command signal invalid may be changed to an arrangement for cutting off a driving power supply circuit, in the same manner as in the case of the first embodiment.

Figure 7:
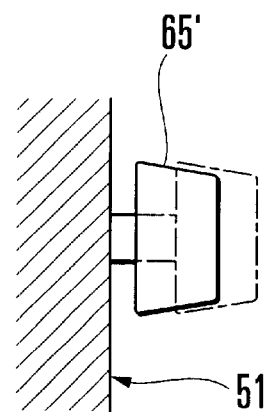
FIG. 7 is a side view showing, in part, a lens barrel according to a fourth embodiment of the present invention.

FIG. 7 is a side view showing in part a lens barrel according to a fourth embodiment of the invention. In the case of the fourth embodiment, a speed potentiometer 65' which functions in the same manner as the speed potentiometer 65 in the third embodiment is mounted on the drive unit 51 so as to be operated in a push-pull manner. The speed potentiometer 65' is arranged to permit setting a speed by being turned around and to be set to the above-stated OFF position by being pulled to a position illustrated with a one-dot chain line in FIG. 7. The fourth embodiment not only gives the same advantageous effect as the third embodiment but also permits the speed potentiometer 65' to quickly resume its original position.

Figure 8:
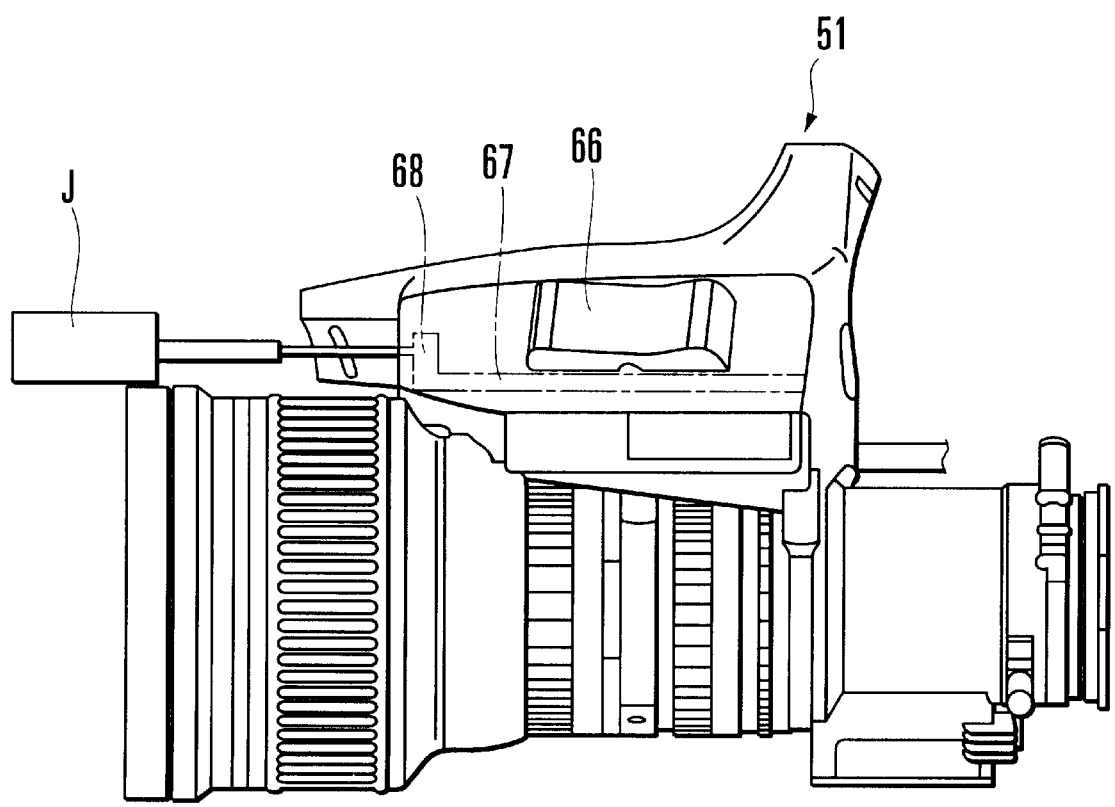
FIG. 8 is a side view showing a lens barrel according to a fifth embodiment of the present invention.

FIG. 8 is a side view showing a lens barrel according to a fifth embodiment of the invention. Referring to FIG. 8, a control circuit board 67, which is housed in the drive unit 51, has a switch 68 arranged thereon to nullify a motor driving operation performed on the motor driving operation member 66. The switch 68 is operable with a tool J, such as a screw driver, from the outside. Thus, the fifth embodiment is arranged not only to be capable of attaining the same advantageous effect as that of the third embodiment but also to permit reduction in the number of parts necessary on the exterior surface of the drive unit 51.

Figure 9:
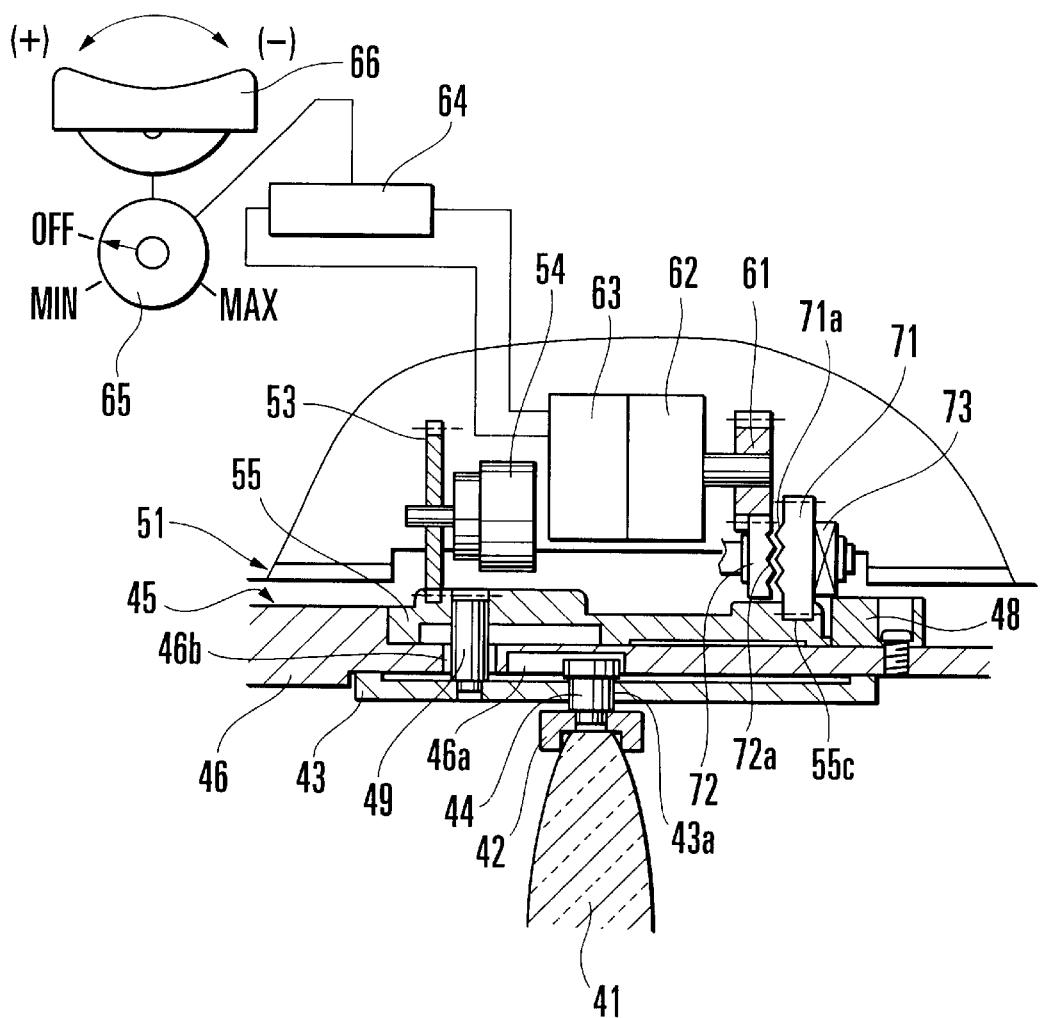
FIG. 9 is a sectional view showing, in part, a lens barrel according to a sixth embodiment of the present invention.

FIG. 9 is a sectional view showing in part a lens barrel according to a sixth embodiment of the invention. All members indicated by the same reference numerals in FIG. 9 as those indicated in FIG. 4 are arranged to perform the same functions as those in FIG. 4 and, therefore, the details of operation of these elements are omitted from the description here. In the sixth embodiment, an electromagnetic clutch is arranged at the motor-driving lens displacing means so as to be automatically controlled to make connection or disconnection according to a manual operation or a motor driving operation. The arrangement permits changeover from the manual operation to the motor driving operation, and vice versa, without any additional switching operation.

In the sixth embodiment, a part corresponding to the idler gear 60 shown in FIG. 4 is composed of a connection gear 71 which has a face gear part 71a and an intermediate gear 72 which has a face gear part 72a. The connection gear 71 is in mesh with a gear part 55c of the operating ring 55. The intermediate gear 72 is in mesh with the motor gear 61. The connection gear 71 is arranged to be axially movable to a predetermined spacing distance away from the intermediate gear 72 and to be driven by the electromagnetic clutch 73. The electromagnetic clutch 73 is controlled so as to be turned on or off in such a way as to cause the connection gear 71 to come into mesh or out of mesh with the intermediate gear 72.

In performing a motor driving operation, the electromagnetic clutch 73 is turned on so as to cause the connection gear 71 and the intermediate gear 72 to be in mesh with each other. Then, the connection gear 71 and the intermediate gear 72 rotate integrally with each other to transmit the driving force of the DC motor 63 to the moving lens group 41. In performing a manual operation, on the other hand, the electromagnetic clutch 73 is turned off to separate the connection gear 71 from the intermediate gear 72. Then, the driving force of the DC motor 63 is no longer transmitted to the moving lens group 41.

Figure 10:
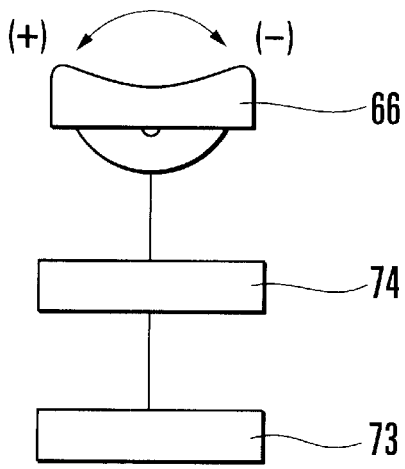
FIG. 10 is a layout view showing a motor-driving operation determining means.
Figure 11:
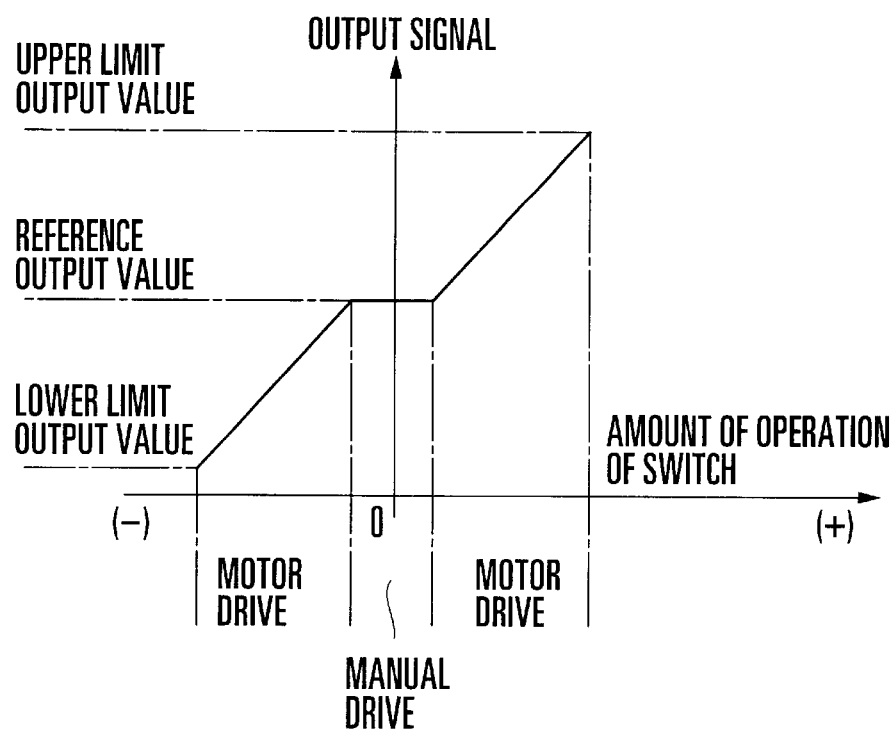
FIG. 11 is a graph showing a relationship between the amount of operation of a motor operation member and the intensity of an output signal thereof.
Figure 12:
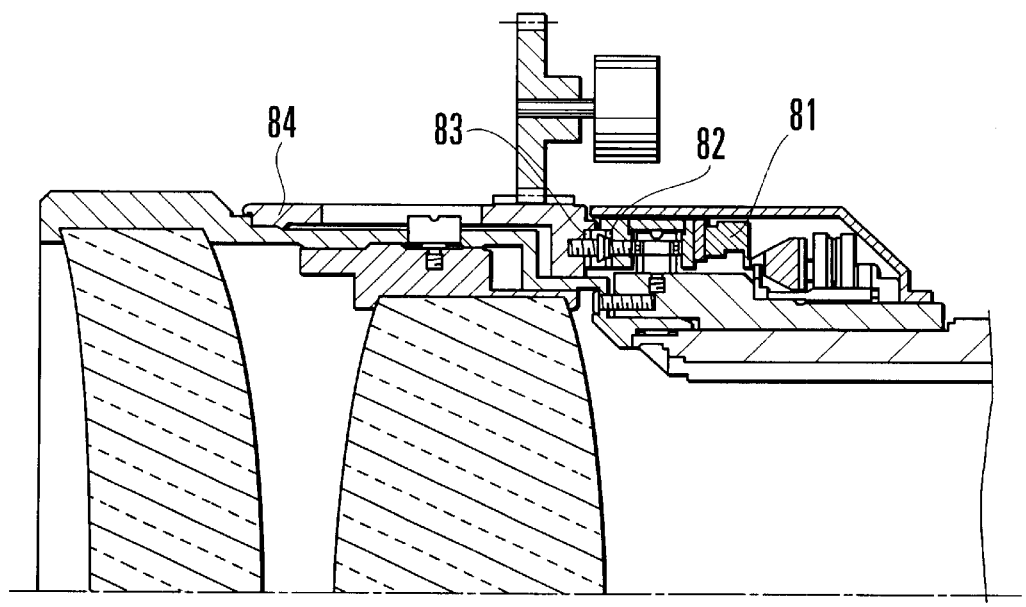
FIG. 12 is a sectional view showing in part a conventional lens barrel.
Figure 13:
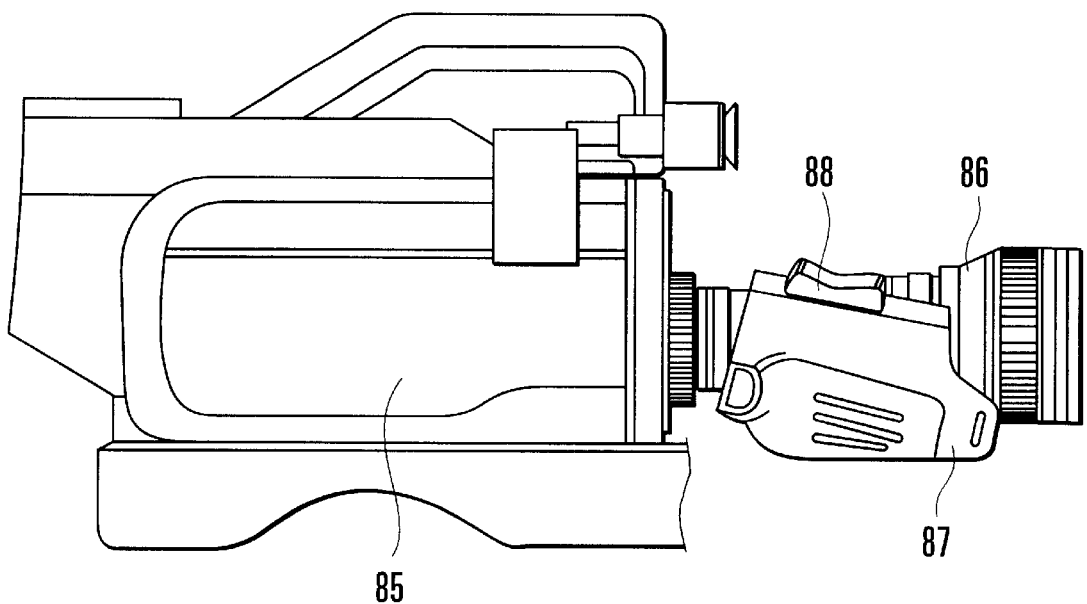
FIG. 13 is a side view showing a TV camera and a TV lens.
Figure 14:
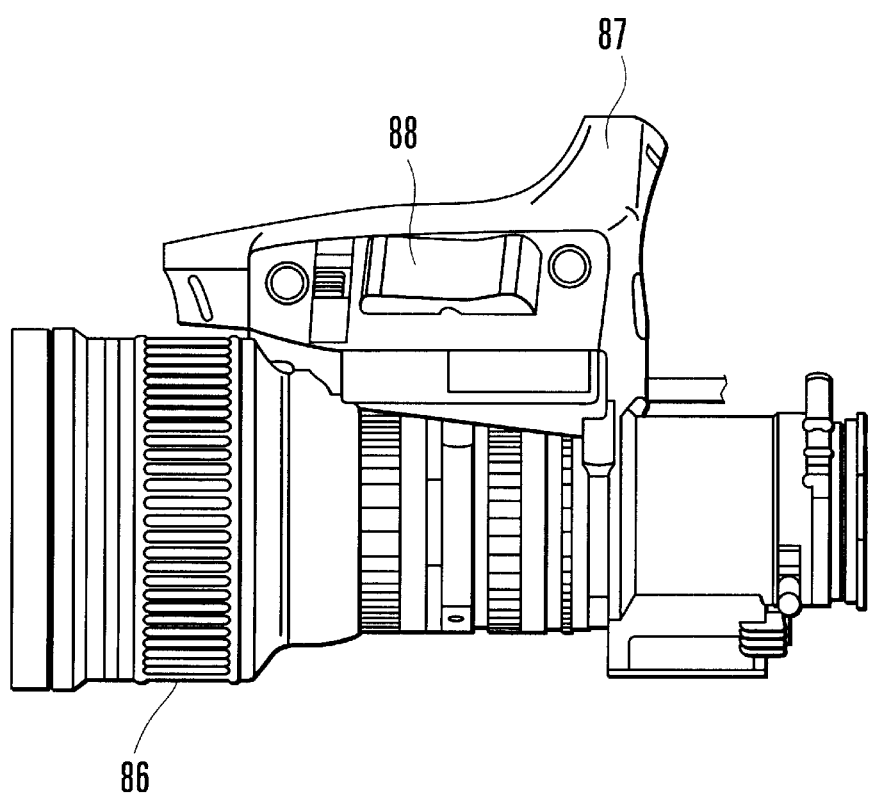
FIG. 14 is a side view showing the TV lens.

The sixth embodiment makes a discrimination between a motor driving operation and a manual operation in the following manner. Referring to FIGS. 10 and 11, for a motor driving operation, the motor driving operation member 66, which is disposed on the surface of the drive unit 51, is operated. A signal, which varies its output value according to the amount of operation of the motor driving operation member 66, is sent to the control circuit 64. In accordance with this signal, the control circuit 64 controls the speed of the DC motor 63. Because the sixth embodiment has no change-over lever for switching between a manual operation and a motor driving operation, a motor-driving operation discriminating means 74 is arranged to make the discrimination between a manual operation and a motor driving operation by detecting a driving command signal output from the motor driving operation member 66. The electromagnetic clutch 73 is controlled according to the result of the discrimination made by the motor-driving operation discriminating means 74. The signal from the motor driving operation member 66 is used not only for giving a speed control command to the control circuit 64 but also for enabling the motor-driving operation discriminating means 74 to detect whether the lens barrel is under a manual operation or a motor driving operation.

As shown in FIG. 10, the motor driving operation member 66 is composed of a seesaw switch. FIG. 11 shows the amount of operation of the motor driving operation member 66 on an abscissa axis and the intensity of the signal output from the motor driving operation member 66 on an ordinate axis. As shown in FIG. 11, the intensity of the output signal varies with the amount of operation of the motor driving operation member 66. When the motor driving operation member 66 is not operated, a reference output value is output therefrom. There is provided an insensitive zone, i.e., a manual operation zone, in which the output signal of the motor driving operation member 66 remains unchanged by a slight amount of operation of the motor driving operation member 66 between motor driving zones on the minus (−) side and the plus (+) side with respect to the amount of operation. This insensitive zone gives some play to the operation of the motor driving operation member 66. The motor-driving operation discriminating means 74 determines that the lens barrel is under a manual driving operation when the output signal is in the neighborhood of the reference output value, and under a motor driving operation when the output signal is not in the neighborhood of the reference output value, i.e., when the output signal is between either an upper or lower limit output value and the reference output value. Then, the electromagnetic clutch 73 performs a switching action on a part of the motor driving lens displacing means on the basis of the determination made by the motor-driving operation discriminating means 74.

The sixth embodiment is also arranged to nullify a command signal from the motor driving operation member 66 or to cut off the power of a power supply circuit by setting the speed potentiometer 65 at the OFF position, to prevent the moving lens group 41 from being driven by an (inadvertent) movement of the motor driving operation member 66.

Further, the sixth embodiment may be arranged to prevent lens driving by an inadvertent operation not only by inhibiting driving with the motor 63 but also by preventing the connection gear 71 from being connected to the intermediate gear 72 through the electromagnetic clutch 73, irrespective of the presence or absence of a motor driving signal, by setting the speed potentiometer 65 at the OFF position.

The electromagnetic clutch 73 is arranged to serve as a connecting-and-disconnecting means for a part of the motor-driving lens displacing means, in combination with the connection gear 71. However, the connecting-and-disconnecting means may be some part other than the electromagnetic clutch 73 and the connection gear 71 as long as the part is included in the motor driving lens displacing means. Further, the electromagnetic clutch 73 may be replaced with some other suitable motor driving change-over means, such as a solenoid or the like. The motor-driving operation discriminating means 74 is arranged to make a determination between a manual operation and a motor driving operation on the basis of a command signal from the motor driving operation member 66 disposed on the exterior surface of the drive unit 51. However, the same determination can be made either on the basis of a command signal from a demanding device arranged in the neighborhood of the lens barrel or a command signal coming from a camera body. It is also possible to make the determination on the basis of a command signal from any of a plurality of such different command generating sources.

As described in the foregoing, the lens barrel according to the invention has switch means arranged to cut off the power supplied from a power supply circuit to a drive source or to inhibit generation of a drive command signal or nullify a drive command signal supplied to the drive source. Therefore, even if a manual operation state and a motor driving operation state happen to coexist, erroneous actions can be prevented. Further, with the switch means disposed at a manually operable position, the operability of the lens barrel can be enhanced by arranging the lens barrel to give priority to the manual operation when the user intentionally performs the manual operation.

What is claimed is:

1. A lens barrel comprising:
   an optical lens unit;
   a manual operation member for manually moving said optical lens unit in an optical axis direction;
   a motor member for driving said optical lens unit in the optical axis direction;
   a motor operation member for actuating said motor member, said motor operation member being arranged to output a signal relating to an operation of said motor operation member, and said motor member being arranged to be driven according to the signal;
   a transmission mechanism that drives said optical lens unit in the optical axis direction by concurrently transmitting an operation force of said manual operation member and a driving force of said motor member to said optical lens unit; and
   a setting member for setting said motor member in an inoperative state.

2. A lens barrel according to claim 1, wherein said setting member is arranged to cut off supply of electric power to said motor member.

3. A lens barrel according to claim 1, wherein said setting member is arranged to bring the signal relating to the operation into an off-state.

4. A lens barrel according to claim 1, wherein said motor operation member is arranged to output a signal corresponding to an amount of operation of said motor operation member.

5. A lens barrel according to claim 4, wherein said motor operation member is a seesaw-type switch.

6. A lens barrel according to claim 1, wherein said motor member is arranged to drive said manual operation member.

7. A lens barrel according to claim 1, wherein said motor operation member is provided on a lens grip disposed at said lens barrel.

8. A lens barrel according to claim 1, wherein said lens barrel is a television lens barrel.

9. A lens barrel according to claim 1, wherein said motor member is an ultrasonic motor.

10. A lens barrel according to claim 1, wherein said motor member is a DC motor.

11. A lens barrel according to claim 1, wherein said optical lens unit comprises a focusing lens.

12. A lens barrel comprising:
an optical lens unit;
a manual operation member for manually moving said optical lens unit in an optical axis direction;
a motor member for driving said optical lens unit in the optical axis direction;
a motor operation member for actuating said motor member, said motor operation member being arranged to output a signal relating to an operation of said motor operation member, and said motor member being arranged to be driven according to the signal;
a transmission mechanism that transmits a driving force of said motor member to said optical lens unit,
determination means for determining, on the basis of the signal relating to the operation, whether said motor operation member is being operated or not;
cut-off means for cutting off transmission of the driving force of said motor member by said transmission mechanism when said determination means determines that said motor operation member is not being operated; and
a setting member for setting said motor member in an inoperative state.

13. A lens barrel according to claim 12, wherein said cut-off means is a clutch mechanism.

14. A lens barrel according to claim 12, wherein said motor operation member is arranged to output a signal corresponding to an amount of operation of said motor operation member.

15. A lens barrel according to claim 12, wherein said motor operation member is a seesaw-type switch.

16. A lens barrel according to claim 12, wherein said motor operation member is provided on a lens grip disposed at said lens barrel.

17. A lens barrel according to claim 12, wherein said lens barrel is a television lens barrel.

18. A lens barrel comprising:
an optical lens unit;
a manual operation member for manually moving said optical lens unit in an optical axis direction;
a motor member for driving said optical lens unit in the optical axis direction;
a motor operation member for actuating said motor member, said motor operation member being arranged to output a signal relating to an operation of said motor operation member, and said motor member being arranged to be driven according to the signal;
a transmission mechanism that drives said optical lens unit in the optical axis direction by transmitting an operation force of said manual operation member and a driving force of said motor member to said optical lens unit; and
a setting member for setting said motor member in an inoperative state.

19. A lens barrel according to claim 18, wherein said setting member is arranged to cut of supply of electric power to said motor member.

20. A lens barrel according to claim 18, wherein said setting member is arranged to bring the signal relating to the operation into an off-state.

21. A lens barrel according to claim 18, wherein said motor operation member is arranged to output a signal corresponding to an amount of operation of said motor operation member.

22. A lens barrel according to claim 21, wherein said motor operation member is a seesaw-type switch.

23. A lens barrel according to claim 18, wherein said motor member is arranged to drive said manual operation member.

24. A lens barrel according to claim 18, wherein said motor operation member is provided on a lens grip disposed at said lens barrel.

25. A lens barrel according to claim 18, wherein said lens barrel is a television lens barrel.

26. A lens barrel according to claim 18, wherein said motor member is an ultrasonic motor.

27. A lens barrel according to claim 18, wherein said motor member is a DC motor.

28. A lens barrel according to claim 18, wherein said optical lens unit comprises a focusing lens.

29. A lens barrel comprising:
an optical lens unit;
a manual operation member;
a motor member;
a motor operation member for actuating said motor member; and
a setting member for setting said motor member in an inoperative state in a mode where both manual operation for driving said optical lens unit with an operation force of said manual operation member in the optical axis direction and a motor driving operation for driving said optical lens unit with a driving force of said motor member in the optical axis direction are performed.

30. A lens barrel according to claim 29, wherein said setting member is arranged to cut off supply of electric power to said motor member.

31. A lens barrel according to claim 29, wherein said setting member is arranged to bring a signal relating to operation into an off-state.

32. A lens barrel according to claim 29, wherein said motor operation member is arranged to output a signal corresponding to an amount of operation of said motor operation member.

33. A lens barrel according to claim 32, wherein said motor operation member is a seesaw-type switch.

34. A lens barrel according to claim 29, wherein said motor member is arranged to drive said manual operation member.

35. A lens barrel according to claim 29, wherein said motor operation member is provided on a lens grip disposed at said lens barrel.

36. A lens barrel according to claim 29, wherein said lens barrel is a television lens barrel.

37. A lens barrel according to claim 29, wherein said motor member is an ultrasonic motor.

38. A lens barrel according to claim 29, wherein said motor member is a DC motor.

39. A photo-taking apparatus comprising a lens barrel according to any one of claims 29 to 38.

40. A lens barrel comprising:
an optical lens unit;
a manual operation member;
a motor member;
a motor operation member for actuating said motor member;
a determination mechanism for determining whether or not to operate said motor member in a mode where both manual operation for driving said optical lens unit in the optical axis direction with an operation force of said manual operation member and a motor driving operation for driving said optical lens unit in the optical axis direction with a driving force of said motor member are performed, and cut off means for cutting off transmission of the driving force of said motor member when said determination mechanism determines not to operate said motor member.

41. A lens barrel according to claim 40, wherein said cut-off means is a clutch mechanism.

42. A lens barrel according to claim 40, wherein said motor operation member is arranged to output a signal corresponding to an amount of operation of said motor operation member.

43. A lens barrel according to claim 42, wherein said motor operation member is a seesaw-type switch.

44. A lens barrel according to claim 40, wherein said motor operation member is provided on a lens grip disposed at said lens barrel.

45. A lens barrel according to claim 40, wherein said lens barrel is a television lens barrel.

46. A lens barrel according to claim 40, wherein said motor member is an ultrasonic motor.

47. A lens barrel according to claim 40, wherein said motor member is a DC motor.

48. A lens barrel according to claim 40, wherein said optical lens unit comprises a focusing lens.

49. A photo-taking apparatus comprising a lens barrel according to any one of claims 40 to 48.

50. A lens barrel comprising:

an optical lens unit;

a manual operation member;

a motor member;

a motor operation member for actuating said motor member; and a setting member for setting said motor driving operation to be in an inoperative state in a mode where both the manual operation for driving the optical lens unit in the optical axis direction with an operation force of the manual operation member and the motor driving operation for driving the optical lens unit in the optical axis direction with a driving force of the motor member are performed.

51. A lens barrel according to claim 50, wherein said setting member sets said motor member in an inoperative state.

52. A lens barrel according to claim 50, wherein said lens barrel comprises a transmission mechanism that transmits the driving force of said motor member to said optical lens unit, and said setting member cuts off transmission of the driving force of said motor member by said transmission mechanism.

53. A lens barrel according to claim 52, wherein said setting member is a clutch mechanism.

54. A lens barrel according to claim 52, wherein said setting member is an electromagnetic clutch mechanism.

55. A lens barrel according to claim 50, wherein said motor operation member is arranged to output a signal corresponding to an amount of operation of said motor operation member.

56. A lens barrel according to claim 55, wherein said motor operation member is a seesaw-type switch.

57. A lens barrel according to claim 50, wherein said motor operation member is provided on a lens grip disposed at said lens barrel.

58. A lens barrel according to claim 50, wherein said optical lens unit comprises a focusing lens.

59. A photo-taking apparatus comprising a lens barrel according to any one of claims 50 to 58.

* * * * *

UNITED STATES PATENT AND TRADEMARK OFFICE
CERTIFICATE OF CORRECTION

PATENT NO.    : 6,597,517 B2
DATED         : July 22, 2003
INVENTOR(S)   : Yasunori Imaoka et al.

It is certified that error appears in the above-identified patent and that said Letters Patent is hereby corrected as shown below:

Column 3,
Line 50, "fourth" should read -- focus --.

Column 4,
Line 21, "friction" should read -- frictional --.
Line 24, "work" should read -- yoke --.
Line 51, "a" should read -- with a --.

Column 6,
Line 30, "pars" should read -- parts --.
Line 48, "a" should be deleted, and "motor 62" should read -- motor 63 --.
Line 54, "operating" should read -- operation --.

Column 7,
Line 30, "operating" should read -- operation --.

Column 8,
Line 38, "operating" should read -- operation --.

Column 11,
Line 15, "unit," should read -- unit; --.

Signed and Sealed this

Third Day of February, 2004

JON W. DUDAS
*Acting Director of the United States Patent and Trademark Office*